June 23, 1942.　　　　C. H. BROWN　　　　2,287,598
METHOD OF MANUFACTURING LIGHT-POLARIZING BODIES
Original Filed Dec. 28, 1937
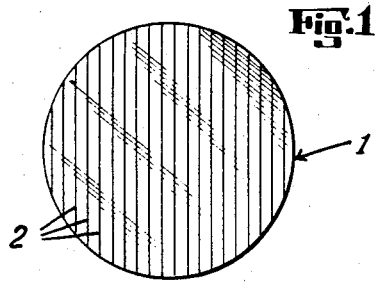
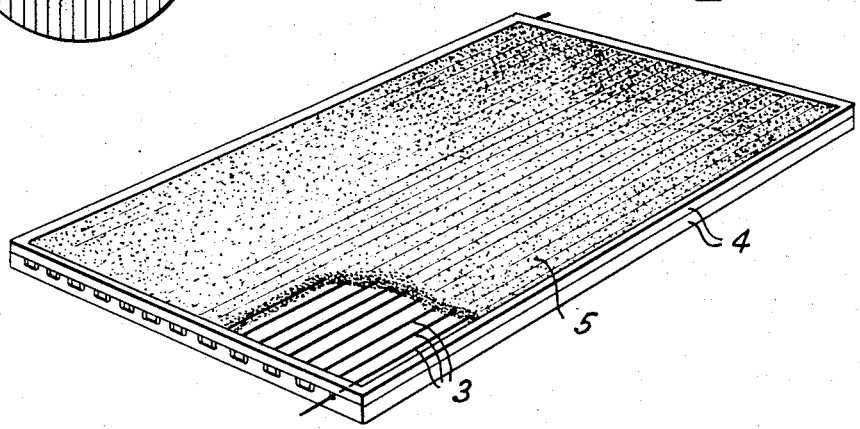
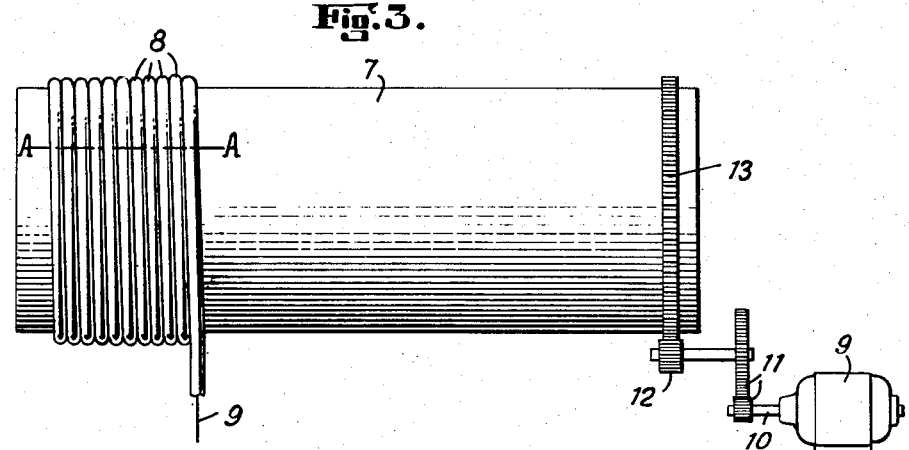
INVENTOR
Charles H. Brown
BY
Donald L. Brown
ATTORNEY Patented June 23, 1942

2,287,598

UNITED STATES PATENT OFFICE 2,287,598

METHOD OF MANUFACTURING LIGHT-POLARIZING BODIES

Charles H. Brown, Baldwin, N. Y., assignor to Polaroid Corporation, Dover, Del., a corporation of Delaware Original application December 28, 1937, Serial No. 182,039. Divided and this application July 31, 1940, Serial No. 348,864

8 Claims. (Cl. 88—65)

This invention is a division of my co-pending application Serial No. 182,039, filed December 28, 1937, and relates generally to methods of manufacturing light-polarizing bodies.

Briefly stated, the light-polarizing body of the present invention comprises an optical element having embedded therein a plurality of parallelly arranged electrically conducting wires. Various features of the invention relate to the methods of manufacturing this wire-embedded light-polarizing body.

A better understanding of the invention may be had by referring to the following description which is accompanied by a drawing, wherein:

Figure 1 shows the light-polarizing body made in accordance with the principles of the invention. It should be understood that although the wires of this polarizing body are of such small diameter as to be substantially invisible, they have been greatly magnified and spaced apart in the drawing for the purpose of illustration;

Figs. 2 and 3 illustrate very generally, and by way of example only, the apparatus which may be used in two different methods of manufacturing the polarizing body of Fig. 1; and Fig. 2a is a fragmentary sectional view through the wires and powdered glass of Fig. 2.

Fig. 1 shows my new polarizing body consisting preferably of a glass plate 1 of any desired form having embedded therein extremely fine, parallelly arranged electrical conductors 2, such as fine platinum, although other electrical conducting materials, such as copper and silver, can also be used. These conductors should be extremely small in cross-section and arranged about 40,000 or more to the inch, in a direction perpendicular to the direction of extension of the wires, in order to provide extremely narrow transparent areas of substantially equal width between adjacent conducting elements. We thus have, in effect, a grating which exerts a polarizing action on light. The direction of polarization may be parallel to the wires, or at an angle thereto, depending upon the width of the apertures between adjacent wires and the wavelength of the transmitted light. It is preferred that there be at least 80,000 of such wires per inch of lens, measured in a direction at right angles to the wires, although it will be appreciated that the number of wires can differ materially from those mentioned above without departing from the spirit and scope of the invention. Where there are 80,000 minute wires per inch, and where the transparent areas between adjacent wires are equal in diameter to the individual wires, it will be apparent that the wires and the areas between them are all less in diameter than the wavelengths of visible light. Under such circumstances, each wire will have a diameter not exceeding .2 micron. Such a condition is preferred. It will be understood, moreover, that the length of each wire is preferably very much greater than its width. The wires should be substantially longer than the wavelengths of visible light. The character of polarization of light transmitted by structures embodying the invention may be controlled. For example, it has been previously observed that light which had passed through a narrow slit less than .1 micron in width was polarized perpendicular to the direction of the slit, whereas on widening the slit to .5 micron, the direction of polarization turned through a right angle.

One method of manufacturing such a polarizing body having embedded electrical conductors is illustrated in Fig. 2 and includes arranging a plurality of equally spaced, thin, metallic wires 3 in parallel on a suitable frame 4, packing powdered glass 5 above and below the wires, and heating the whole mass in any suitable furnace (if desired, a high frequency furnace), so that the glass and wires are heated simultaneously, the glass melting around the wires, then stretching both the glass and wires while the glass is in a plastic state. This stretching will elongate the glass and the wires and simultaneously bring the wires closer together. By cutting the elongated glass into sections and repeating the heating and stretching process numerous times, the wires will be made extremely thin and be brought closer and closer together to give the desired number per inch. During this process of manufacture, the glass sections can be joined at their side edges to provide a wider section which, in turn, may, after further stretching, be again joined at its side edges to other similar sections. Where it is desired to employ a polarizing body of such embedded conducting wires for optical correction purposes, the glass body with its embedded wires can either be shaped while heated first to the desired general form and then ground to give the desired curves, or else the grinding of the curves can be made from a planar polarizing blank, provided the embedded wires do not protrude from the surfaces of the glass. It is preferred, though not essential, that the temperature coefficient of expansion of the wires be not greatly different from that of the surrounding glass.

Another and a preferred method of manufacturing my new light-polarizing body is shown in Fig. 3. The fine wire (preferably platinum) is first passed through glass tubing 8 having a relatively low melting point, and the glass tubing 8 and enclosed wire closely wound over a hollow drum 7, as shown. Drum 7 may be made of some ceramic material. The drum may be slowly revolved by means of a suitable low speed motor 9 whose shaft 10 is linked through reduction gears 11 to a pinion 12, in turn engaging a ring gear 13 attached to one end of the drum 7. Drum 7 is heated in any suitable manner, such as by a flame, not shown, in the interior thereof so that the adjacent turns of glass tubing 8 and embedded wires fuse into an integral mass. It is preferred that the drum 7 be relatively large, so that the glass tubing has a comparatively small radius of curvature as it is wound around the drum. If the type of glass tubing employed is such that it does not bend very readily, then either the glass tubing or the drum should be pre-heated to a temperature sufficient to enable bending of the tubing around the drum. If the drum 7 is pre-heated, then the temperature thereof should be raised for fusing the glass and wires into an integral mass after the tubing is wound around the drum.

After the closely wound turns of glass tubing 8 and their wires are fused into an integral mass, the drum is permitted to cool somewhat, and the resulting glass and wire mass is cut along a line A—A parallel to the axis of the drum, after which the glass and wires are stretched while the glass is still in a plastic state. Since the wires are substantially parallel, the stretching operation will elongate the glass and the wires, simultaneously bringing the wires closer together and forming a relatively thin ribbon. This resulting ribbon of glass with embedded parallelly arranged wires is, in turn, wound on the drum in the same manner as the glass tubing was previously wound on the drum, and the process of fusing, cutting and stretching repeated as above. This process can be repeated as often as desired in order to obtain a polarizer of a desired size having a required number of wires per inch. It is a relatively simple matter to obtain a polarizer by this particular method of manufacture, which has 40,000 or more wires, each having a diameter less than .5 micron, arranged parallel to one another and embedded in the glass.

An advantage of using a polarizing body having embedded wires is that the body itself forms the lens without any need for sandwiching the same between glass blanks, as heretofore required when a film is employed.

Although glass has been mentioned as the preferred transparent optical element for the light-polarizing body, it should be understood that my polarizing body is not limited to the use of glass, since other transparent optical materials made from plastics, in contradistinction to glass, may be employed in connection with embedded parallel wires to form my polarizing body.

Moreover, the methods of manufacturing my light-polarizing body are not limited to the precise steps outlined above, since various departures may be made in the processes without departing from the spirit and scope of the invention. For example, instead of passing the fine wire through a glass tubing, the glass tubing can be formed around the wire during the final process of making the fine wire.

It should be further understood that the light-polarizing body of this invention may be used wherever there is need for such a body. For example, my new polarizing body may be used in spectacles, as a window, in headlights, in vehicular windshields, in microscopes, as an analyzer in strain detection systems, etc.

Throughout the specification and claims, the expression "stretch" will be deemed to include any elongation of the material to effect an alteration in the positioning of, or in the diameter of the embedded wires, or a contraction of the material to effect the same purpose, or a combination of the two actions.

It should also be understood that the following claims are intended to cover all the generic and specific features of the invention herein described, and all statements of the scope of the invention which, as a matter of language, might be said to fall therebetween.

Having described my invention, what I claim as new and desire to secure by Letters Patent is:

1. The method of manufacturing a polarizing body consisting of a transparent optical element having embedded therein a plurality of minute parallelly arranged electrical conductors, which comprises introducing parallelly arranged wires into said optical element, heating said wires and optical element simultaneously to bring said element into a plastic condition, and stretching said element and wires to elongate said wires and bring same closer together until the diameter of each wire has been reduced to substantially one-half micron or less and until the distances between the traces of adjacent wires on a plane parallel to the surface of said element are reduced to substantially one-half micron.

2. The method of manufacturing a polarizing body consisting of a transparent optical element having embedded therein a plurality of fine parallelly arranged electrical conductors, which comprises introducing parallelly arranged wires into said optical element, said wires lying substantially within a common plane, heating said wires and optical element to a suitable temperature, stretching said element and wires to elongate said wires and bring same closer together, cutting said stretched element and wires into sections, joining said sections together, and repeating said process until the diameter of each wire has been reduced at least to one-half micron and the width of the aperture between adjacent wires reduced at least to one-half micron.

3. The method of manufacturing a polarizing body consisting of a glass optical element having embedded therein a plurality of fine parallelly arranged electrical conductors, which comprises winding a continuous length of glass tubing having a fine wire contained therein over a portion of the length of a drum, heating said drum to fuse said glass into an integral mass, cutting said integral mass to form an extensible blank and stretching same while in a plastic state until the diameter of the wires and the width of the aperture between adjacent wires have been reduced substantially to one-half micron.

4. The process of manufacturing a polarizing body, which comprises forming a suspension of wires in a stretchable, plastic, suspending medium spaced from each other by distances substantially equal to the diameters of the wires and lying substantially within a common plane, and stretching said medium and wires simultaneously until the diameters of the wires and said distances are less than one-half micron.

5. The method of manufacturing a polarizing body consisting of a glass optical element having embedded therein a plurality of fine parallelly arranged electrical conductors, which comprises winding a continuous length of glass tubing having a fine wire contained therein over a portion of the length of a drum, heating said drum to fuse said glass and wires into an integral mass, cutting said integral mass to form an extensible blank and stretching same while in a plastic state until the diameter of the wires and the distances therebetween have been reduced substantially to one-half micron, the coefficient of expansion of said wire being substantially the same as that of said glass.

6. The process of forming a polarizing device, which comprises embedding a plurality of metallic wires of diameters not exceeding one micron, in substantially uniformly spaced, parallel relation in a substantially common plane within a sheet-like body of transparent, plastic material, the coefficient of expansion of said wire being substantially the same as that of said plastic, rendering said body plastic, and stretching said body until the distance between adjacent wires in said plurality is less than the wave length of visible light and until the diameters of said wires have been reduced at least by one-half.

7. The process of forming a polarizing device, which comprises embedding in a substantially common plane within a sheet-like body of transparent, stretchable material a plurality of metallic wires spaced apart from each other in substantially parallel relation by a distance approximately equal to the diameter of said wire, and stretching said body until said distance and the diameter of said wires is less than the wave length of visible light.

8. The process of forming a polarizing device, which comprises forming a suspension of wire-like metallic conducting elements in a suspending medium, said elements lying substantially within a common plane and being spaced from each other by distances substantially equal to the diameters thereof, rendering said medium plastic, and stretching said medium and elements simultaneously until the diameters of the elements and said distances are less than the wave length of visible light.

CHARLES H. BROWN.

---

CERTIFICATE OF CORRECTION.

Patent No. 2,287,598.

June 23, 1942.

CHARLES H. BROWN.

It is hereby certified that error appears in the printed specification of the above numbered patent requiring correction as follows: Page 2, second column, line 59, after "glass" insert the words --and wires--; and that the said Letters Patent should be read with this correction therein that the same may conform to the record of the case in the Patent Office.

Signed and sealed this 6th day of April, A. D. 1943.

(Seal)

Henry Van Arsdale,
Acting Commissioner of Patents.

CERTIFICATE OF CORRECTION.

Patent No. 2,287,598.                                           June 23, 1942.

CHARLES H. BROWN.

It is hereby certified that error appears in the printed specification of the above numbered patent requiring correction as follows: Page 2, second column, line 59, after "glass" insert the words --and wires--; and that the said Letters Patent should be read with this correction therein that the same may conform to the record of the case in the Patent Office.

Signed and sealed this 6th day of April, A. D. 1943.

(Seal)
                                                Henry Van Arsdale,
                                           Acting Commissioner of Patents.